United States Patent [19]

Turner

[11] Patent Number: 4,750,782
[45] Date of Patent: Jun. 14, 1988

[54] SUNROOF AIR DEFLECTOR

[75] Inventor: Douglas A. Turner, Newport Beach, Calif.

[73] Assignee: G. T. Styling, Inc., Costa Mesa, Calif.

[21] Appl. No.: 4,911

[22] Filed: Jan. 20, 1987

[51] Int. Cl.⁴ .................................... B60J 7/22
[52] U.S. Cl. .................................... 296/217
[58] Field of Search .................. 296/217, 91, 1 S; 293/128

[56] References Cited

U.S. PATENT DOCUMENTS 4,446,179 5/1984 Waugh .................... 293/128

FOREIGN PATENT DOCUMENTS 3132713 3/1983 Fed. Rep. of Germany ...... 296/217

Primary Examiner—Robert R. Song
Attorney, Agent, or Firm—Knobbe, Martens, Olson & Bear

[57] ABSTRACT

An air deflector which is securable to a roof of a vehicle having an opening for a sunroof, to deflect the flow of air over the vehicle when the vehicle is in motion and a method of securing the same. The air deflector comprises an elongate deflecting panel having a length at least as long as the forward edge of the sunroof opening, adhesive along one of the elongate edges of the panel to secure the panel to the roof, and a pair of end supports extending downwards from the ends of the panel to hold the panel at an angle relative the roof.

1 Claim, 1 Drawing Sheet

SUNROOF AIR DEFLECTOR

BACKGROUND OF THE INVENTION

Sunroofs on vehicles, and particularly on automobiles, have proven to be especially popular. Sunroofs offer the benefits of a convertible top, e.g., sunshine and ventilation, while retaining the desirable characteristics of a permanent sedan roof, e.g., structural integrity and durability. However, the use of the sunroof is not without its drawbacks.

When an airstream flowing over the hood of a moving vehicle strikes the abruptly raised surface of the windshield, a low pressure area is formed immediately behind the top of the windshield. An open sunroof often results in an undesirable amount of airflow in the passenger compartment of the vehicle due to the air circulation down through the sunroof caused by this low pressure zone.

In order to lower the level of airflow in the passenger compartment when the sunroof is open, air deflectors are often placed along the front edge of the sunroof opening. These deflectors force the air that is rushing to the low pressure area created by the windshield to move upwardly, so that the airstream is directed beyond the back edge of the sunroof opening. This has the effect of significantly decreasing the level of airflow in the passenger compartment. Additionally, the deflectors act as a rain shield, permitting the sunroof to be partially opened during inclement weather.

Many cars, however, are provided with sunroofs but no air deflectors. Although air deflectors exist which can be secured by means of screws extending through the roof of the car, this installation process is relatively difficult and can result in the formation of rust spots, due to the violation of the integrity of the vehicle's finish. Alternatively, air deflectors are available that can be secured by means of brackets to the track of the sunroof. In addition to the danger that these brackets will be inadvertently detached, or will damage the sunroof track, the brackets interfere with the aesthetic appearance of the car.

SUMMARY OF THE INVENTION

This invention provides an air deflector that is securable to the roof of a vehicle having an opening for a sunroof. When the air deflector is attached to the vehicle, proximate the opening, the deflector will deflect the flow of air over the vehicle, and away from the sunroof opening when the vehicle is moving forward. The deflector includes an elongate air deflecting panel having a length at least as long as the forward edge of the sunroof opening, a length of adhesive along one of the elongate edges of the panel, and a pair of end supports extending downward from the ends of the panel to hold the panel at an angle relative the roof when the adhesive is pressed against the roof to secure the panel to the roof.

Preferably, the panel can be bowed to follow the contours of the vehicle to which the air deflector is to be secured. Advantageously, a lip is provided along the elongate edge of the panel on which the adhesive is located to increase the surface area over which the adhesive will contact the roof. The air deflector is further advantageously provided with a detachable mask over the adhesive to prevent the adhesive from curing prior to being pressed against the roof of the vehicle. In addition, it is preferable that the air deflector be transparent so as not to limit the line of sight from within the passenger compartment. Furthermore, it is advantageous if the air deflector is a sun filter.

Another aspect of the invention is a method of securing an air deflector to the roof of a vehicle having an opening for a sunroof, wherein the deflector includes an elongate deflecting panel, adhesive along one of the elongate edges of the panel and a pair of edge supports extending downward from the ends of the panel. The method comprises the steps of positioning the adhesive proximate and parallel to the front edge of the opening, and pressing the adhesive against the roof of the vehicle to secure the panel to the roof. When the air deflector is provided with a detachable mask over the adhesive to protect the adhesive from curing prior to being pressed against the roof, this method further includes the step of detaching the mask from the adhesive.

Preferably, the method also includes the steps of marking the position of the adhesive, wiping the position where the adhesive is to be secured with alcohol, and drying the alcohol.

DESCRIPTION OF THE DRAWINGS

These and other features of the invention will now be described with reference to the drawings of the preferred embodiment, which is intended to illustrate, and not to limit, the invention, and in which.

DESCRIPTION OF THE PREFERRED EMBODIMENT

Figure 1:
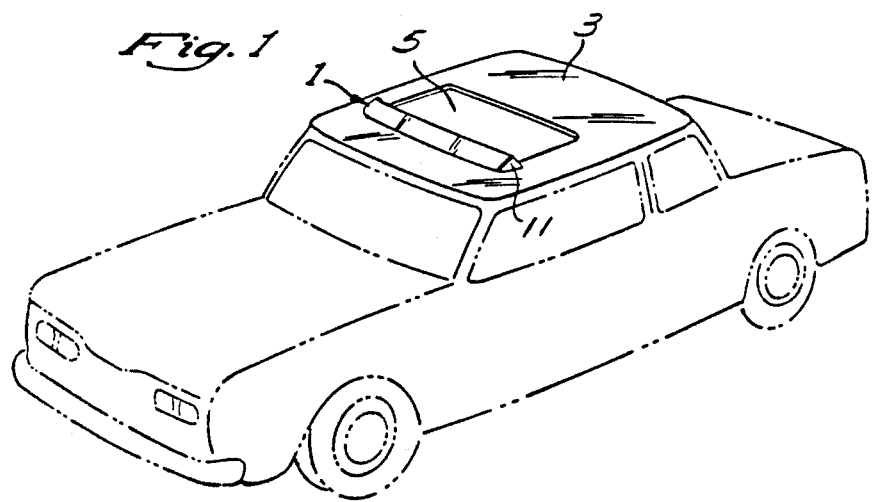
FIG. 1 is a perspective view of the air deflector of the present invention secured to a roof of a vehicle having a sunroof, with portions in phantom showing the invention employed on an automobile.
Figure 2:
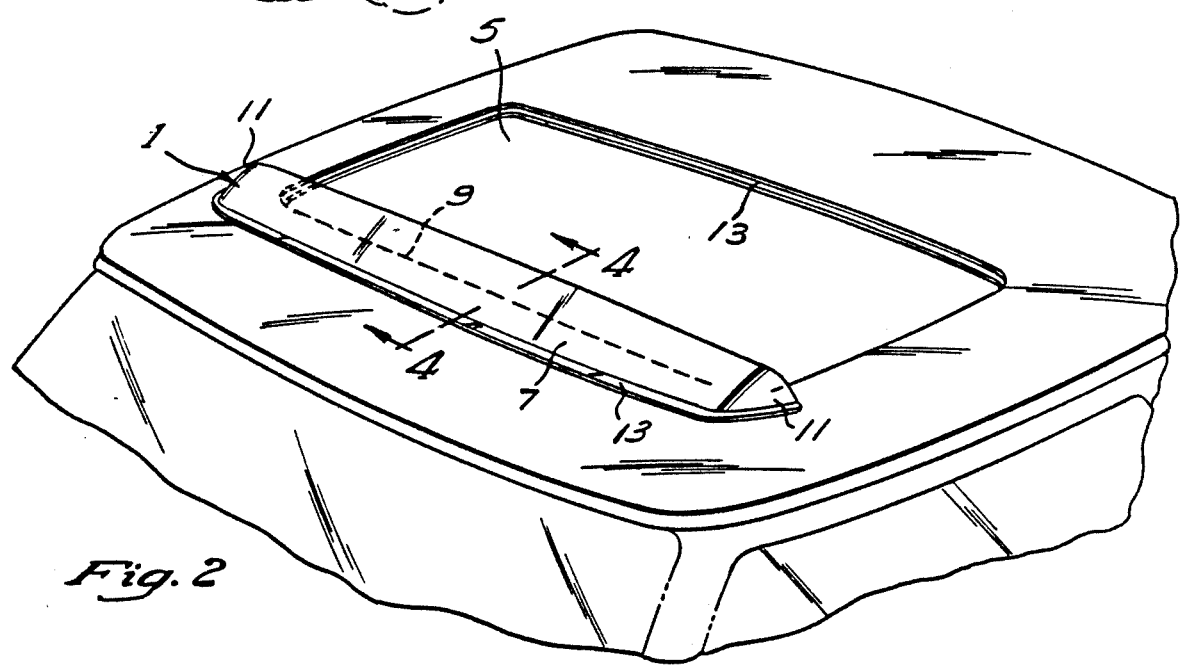
FIG. 2 is an enlarged partial perspective view illustrating the air deflector and roof of FIG. 1.

Referring to FIG. 1, an air deflector 1 is shown secured to a roof 3 of an automobile (shown in phantom), having a sunroof opening 5. As more clearly seen in FIG. 2, the air deflector 1 includes an elongate deflecting panel 7 having a length slightly longer than a forward edge 9 of the sunroof opening 5.

A pair of generally triangular end supports 11 extend downward from the ends of the panel 7 in order to hold the panel 7 at an angle relative to the roof 3. The triangular supports 11 should be shaped so that the acute interior angle formed by the panel 7 and the roof 3 is just large enough so that the panel 7 will deflect the flow of air past a rear edge 13 of the sunroof opening 5 at normal cruising speeds. This will have the affect of minimizing the amount of drag created by the air deflector 1, while also minimizing the amount of torque that is transmitted to the junction of the air deflector and the vehicle roof.

Advantageously, the panel 7 is integrally formed with the end supports 11 so that each end of the panel 7 forms one of the edges of one of the triangular supports, and the lower elongate edge of the panel 7 and the lower edges of the supports form a generally coplanar, continuous edge which can be fitted against the roof of the vehicle.

Since vehicle roofs are not always perfectly flat, the panel and supports are preferably made from a material, such as plexiglass, that can be bowed to conform to the contours of the roof of the vehicle. Advantageously, the use of a darkened plexiglass shades the sun from the passenger compartment without obstructing the line of sight from the passenger compartment.

Figure 4:
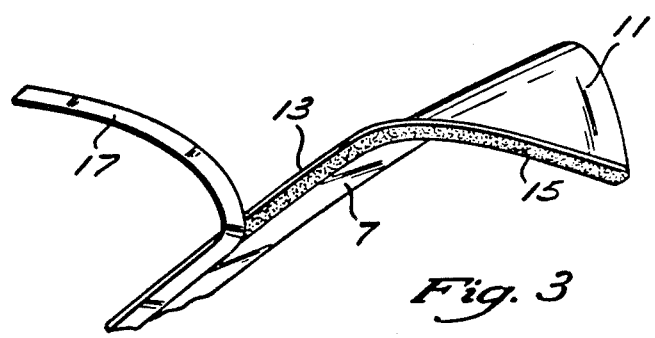
FIG. 4 is an enlarged partial sectional view illustrating the junction of the air deflector and the vehicle roof.
Figure 3:
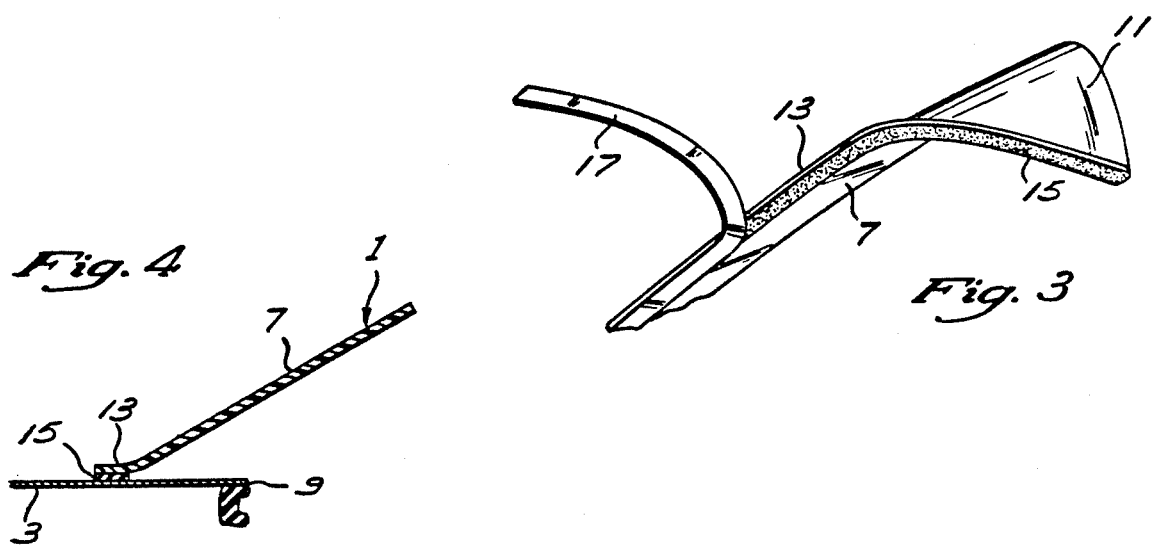
FIG. 3 is an enlarged partial perspective view of the air deflector, illustrating the detachable mask over the adhesive.

A narrow out-turned lop 13 is formed along the continuous edge formed by the end supports 11 and the elongate edge of the panel 7 to increase the surface over which the air deflector contacts the vehicle roof. As best seen in FIGS. 3 and 4, a strip 15 of double-sided adhesive tape is affixed along the lip 13 to secure the panel 7 and end supports 11 to the roof of the vehicle. In order to prevent the strip of adhesive from curing prior to the air deflector being pressed against the roof, a detachable protective masking strip 17 shown in FIG. 3, can be positioned over the exposed adhesive-covered edge of the strip 15.

The process used to attach the air deflector to the roof of a vehicle will now be described. Before beginning the process, it is preferable that the area in front of the sunroof opening 5 be cleaned with soap and water. The air deflector 1 is then positioned as closed to the front edge 9 of the sunroof opening 5 as possible, so that it is parallel to the front edge of the opening. Typically, this will mean that the rear edge of the air deflector will extend over the sunroof opening 5 as shown in FIG. 4. However, when the sunroof is of the "pop out" variety, i.e., is lifted off of the roof, it is necessary to ensure that the position of the air deflector will not interfere with this process.

After the desired position of the air deflector has been determined, it is desirable to mark the position of the adhesive strip 15 with masking tape or other means. The roof 3 can then be wiped with alcohol where the adhesive strip 15 will contact the roof in order to further prepare the surface for bonding. The alcohol should then be allowed to air dry. After the alcohol has dried, the detachable, protective masking strip 17 is removed from the lip 13 of the air deflector and the adhesive strip 15 is pressed firmly against the roof 3 of the vehicle in the position marked in order to firmly secure the end supports 11 and the panel 7 to the roof. The vehicle should then be allowed to rest for a period of time, about 24 hours, in order to let the adhesive bond fully cure.

Thus, there is provided a simple, secure, and aesthetically pleasing air deflector for a vehicle sunroof, heretofore unavailable.

I claim:

1. An air deflector which is adhesively securable to the exterior surface of the roof of a vehicle having an opening for a sunroof to deflect the flow of air over said vehicle when said vehicle is in motion, comprising:

an elongate deflecting panel having a length at least as long as the forward edge of said sunroof opening, said panel including a lip along the entire length thereof at its elongate leading edge and being sufficiently flexible to bow to conform to the shape of said exterior surface of said roof of said vehicle;

a strip of double-sided adhesive tape adhesively secured along substantially the entire length of said lip, said tape adhesively securable to said exterior surface of said roof to form a weather-tight adhesive seal between substantially the entire length of said lip and said exterior surface of said roof; and a pair of end supports extending downward from the ends of said panel to hold said panel at an angle relative said roof when said tape is pressed against said roof to secure said panel to said roof.

* * * * *